US007660976B2

(12) United States Patent
Kurosaki (10) Patent No.: US 7,660,976 B2
(45) Date of Patent: Feb. 9, 2010

(54) REDUCED READ TIME IN ELECTRONIC APPARATUS AND MEDIA CONTROL METHOD IN ELECTRONIC APPARATUS

(75) Inventor: Toshiyuki Kurosaki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 540 days.

(21) Appl. No.: 11/293,850

(22) Filed: Dec. 2, 2005

(65) Prior Publication Data

US 2006/0119878 A1    Jun. 8, 2006

(30) Foreign Application Priority Data

Dec. 3, 2004    (JP) .............................. 2004-382295

(51) Int. Cl.
*G06F 15/177* (2006.01)
*G06F 9/00* (2006.01)
*G06F 1/24* (2006.01)
*G06F 1/26* (2006.01)
*G06F 1/32* (2006.01)
*G11B 17/03* (2006.01)

(52) U.S. Cl. .............................. 713/1; 713/2; 713/100; 713/300; 713/320; 720/600

(58) Field of Classification Search ...................... 713/1, 713/2, 100, 300, 320; 720/600
See application file for complete search history.

(56) References Cited

U.S. PATENT DOCUMENTS

| 5,548,784 | A | * | 8/1996 | Easley et al. ................... 710/18 |
| 6,434,697 | B1 | * | 8/2002 | Leyda et al. .................... 713/2 |
| 6,493,506 | B1 | * | 12/2002 | Schoner et al. ............. 386/126 |
| 6,718,461 | B1 | * | 4/2004 | Ewertz ........................... 713/1 |
| 6,754,817 | B2 | * | 6/2004 | Khatri et al. .................... 713/1 |
| 6,771,574 | B2 | * | 8/2004 | Fujimoto et al. ........... 369/47.1 |

\* cited by examiner

*Primary Examiner*—Ji H Bae
(74) *Attorney, Agent, or Firm*—Katten Muchin Rosenman LLP (57) ABSTRACT

An electronic apparatus is provided with a media reader for accessing a removable recording medium and performs initial processes for ensuring proper access to the recording medium. A memory retains its content even when the supply of power to the media reader is discontinued. The result of the initial processes is stored in the memory when the supply of power to the media reader is discontinued. When the supply of power to the media reader is resumed, the media reader accesses the recording medium by using the result of the initial processes held in the memory.

5 Claims, 6 Drawing Sheets

REDUCED READ TIME IN ELECTRONIC APPARATUS AND MEDIA CONTROL METHOD IN ELECTRONIC APPARATUS

BACKGROUND OF THE INVENTION

1. Field of the Invention

The present invention relates to the structure of an electronic apparatus and a medium control method in an electronic apparatus and, more particularly, to a technology for reducing time required to read information stored in a recording medium.

2. Description of the Related Art

Recently, there is growing awareness of the need for power saving in electronic appliances such as game apparatuses and personal computers. The need for power saving is especially high in electronic appliances such as portable game apparatuses and personal computers in which power is supplied by a battery, due to the need for extended drive time in the electronic appliances.

For power saving in electronic appliances, a power saving mode in which the electronic appliance is not used is provided in addition to a normal mode. Many of these electronic appliances are designed to access a removable recording medium such as a compact disk (CD), a digital video disk (DVD) or a recording medium for exclusive use in game apparatuses including a portable game apparatus.

In reading from such recording mediums, initial processes such as reading of information specific to the recording medium or detection of characteristics specific to the recording medium may be performed for stable access to the recording medium. In order to perform the initial processes, a certain time is required.

SUMMARY OF THE INVENTION

The present invention has been made in view of the aforementioned circumstances and relates to reduction in time required to read information stored in a recording medium.

In one embodiment of the present invention, there is provided an electronic apparatus that is provided with a media reader for accessing a removable recording medium and that performs initial processes for ensuring proper access to the recording medium, said electronic apparatus comprising a memory that retains its content even when the supply of power to the media reader is discontinued. A result of the initial processes is stored in the memory when the supply of power to the media reader is discontinued, and when the supply of power to the media reader is resumed, the media reader accesses the recording medium by using the result of the initial processes retained in the memory. In accordance with this embodiment, the recording medium can be accessed without performing the initial processes when the supply of power to the medium reader is resumed. Accordingly, time required to read information stored in the recording medium is reduced.

The supply of power to the media reader may be discontinued in a power saving mode. In accordance with this embodiment, time required to read information stored in the recording medium is reduced, while reducing power consumption at the same time.

The supply of power to the media reader may be discontinued in a mode in which another recording medium is read from. In accordance with this embodiment, time required to read information stored in the recording medium is reduced, while reducing power consumption at the same time.

The electronic apparatus may further comprise an exchange determination unit which determines on the possibility of the recording medium being exchanged; and an initial process control unit which skips the initial processes when it is determined by the exchange determination unit that there is no possibility that the recording medium has been exchanged since the discontinuation of the supply of power to the media reader until the resumption of the supply. Access to the recording medium may be performed by using the result of the initial processes retained in the memory when the initial process control unit skips the initial processes. In accordance with this embodiment, time required to read information stored in the recording medium is reduced when there is no possibility that the recording medium is exchanged.

The electronic apparatus may further comprise an opening and closing unit that enables the recording medium to be exchanged by being opened, wherein the exchange determination unit determines that the recording medium has not been exchanged when the opening and closing unit is not opened after a shift to the power saving mode and before a return to a normal mode. In accordance with this embodiment, a determination can easily be made as to whether the recording medium is exchanged.

The present invention also relates to a media control method in an electronic apparatus comprising a memory that retains its content even when the supply of power to a media reader for accessing the recording medium is discontinued. The media control method for an electronic apparatus comprises the steps of: performing initial processes for ensuring proper access to the removable recording medium storing a result of the initial processes in the memory; and accessing from the media reader to the recording medium by using the result of the initial processes retained in the memory, when the supply of power to the media reader is resumed subsequent to the discontinuation thereof. In accordance with this embodiment, time required to read information stored in the recording medium is reduced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

In the following detailed description of the preferred embodiments, reference is made to the accompanying drawings, which form a par thereof, and within which are shown by way of illustration specific embodiments by which the invention may be practiced.

Figure 1:
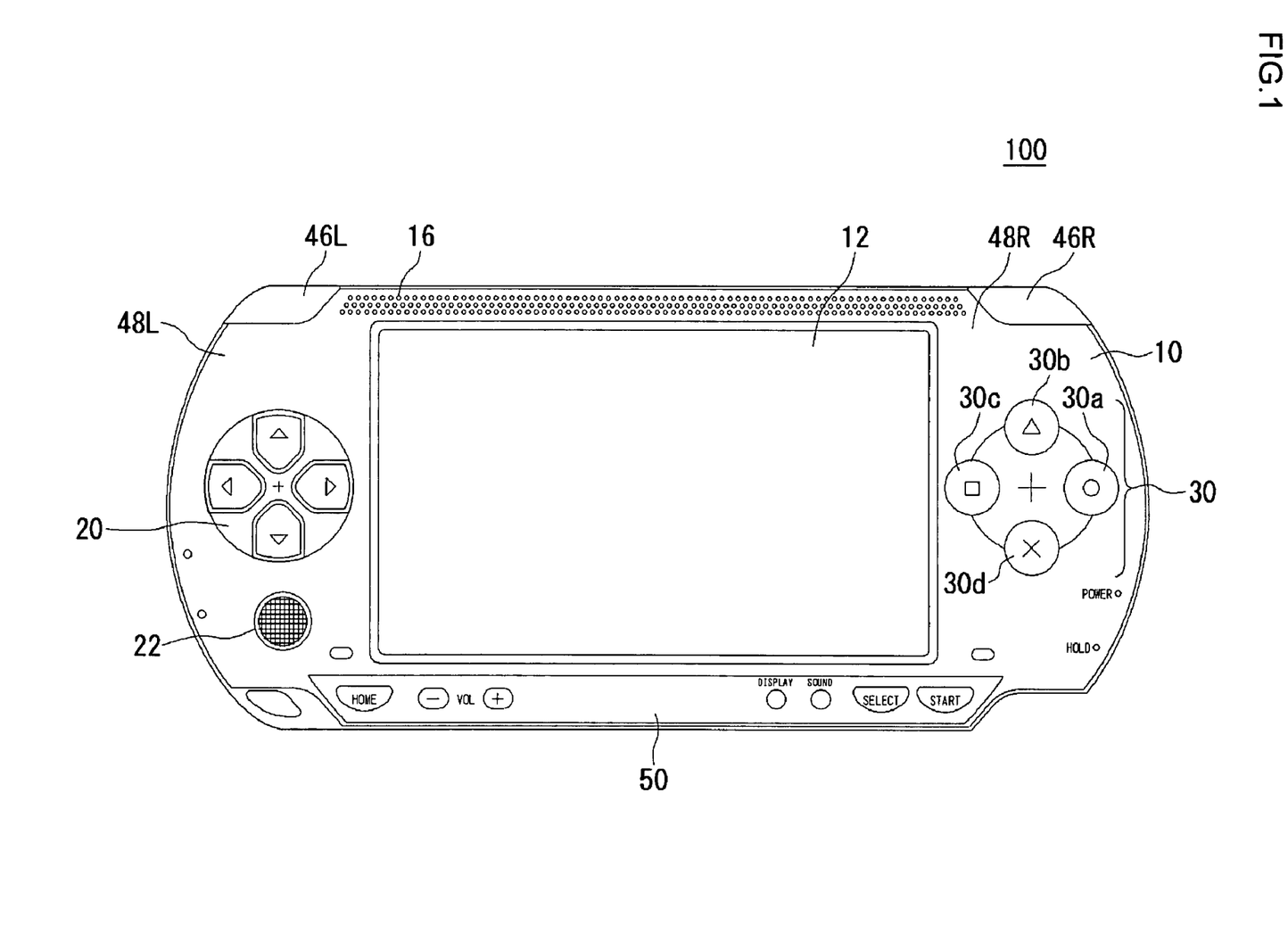
FIG. 1 is a front view of an electronic apparatus according to an embodiment of the present invention.

FIG. 1 is a front view of an electronic apparatus 100 according to an embodiment of the present invention. Overall, a housing 10 of the electronic apparatus 100 is elliptically shaped and horizontally oriented. Each end of the housing 10 is curved to form an arc centered around a position displaced from the center line by a certain distance.

A liquid crystal display (hereinafter, referred to as ILCDII) 12 is embedded as a display apparatus at the center of the housing 10. The LCD 12 displays a game screen while the electronic apparatus 100 is functioning as a game apparatus. The LCD 12 displays a schedule or an address list when the electronic apparatus 100 is functioning as a personal information terminal.

The surface of a top part 10a of the housing 10 is populated with a left-hand area 48L primarily held by the left hand of a user, a right-hand area 48R primarily held by the right hand of a user, a horizontally oriented button area 50 located below the LCD 12 and a decorated area 16 located above the LCD 12. Various buttons are arranged in the button area 50.

The left-hand area 48L is provided with an arrow key 20 primarily for providing an input for direction indication and an analog device 22 primarily for providing an analog input for direction indication. The right-hand area 48R is provided with push buttons 30a, 30b, 30c and 30d (hereinafter, may be generically referred to as "buttons 30") primarily for providing an input for a single instruction.

The button area 50 is provided in the vicinity of the outer edge of the top part of the housing 10 immediately facing the user holding the electronic apparatus 100. The button area 50 is an area in which various buttons other than the arrow key 20, the analog device 22 and the push buttons 30 are provided.

An L button 46L is a button operated by the user's left index finger or left middle finger. An R button 46R is a button operated by the user's right index finger or right middle finger. The L button 46L and the R button 46R are used to give a special instruction that can not be provided merely by the arrow key 20 or the push buttons 30.

Figure 2:
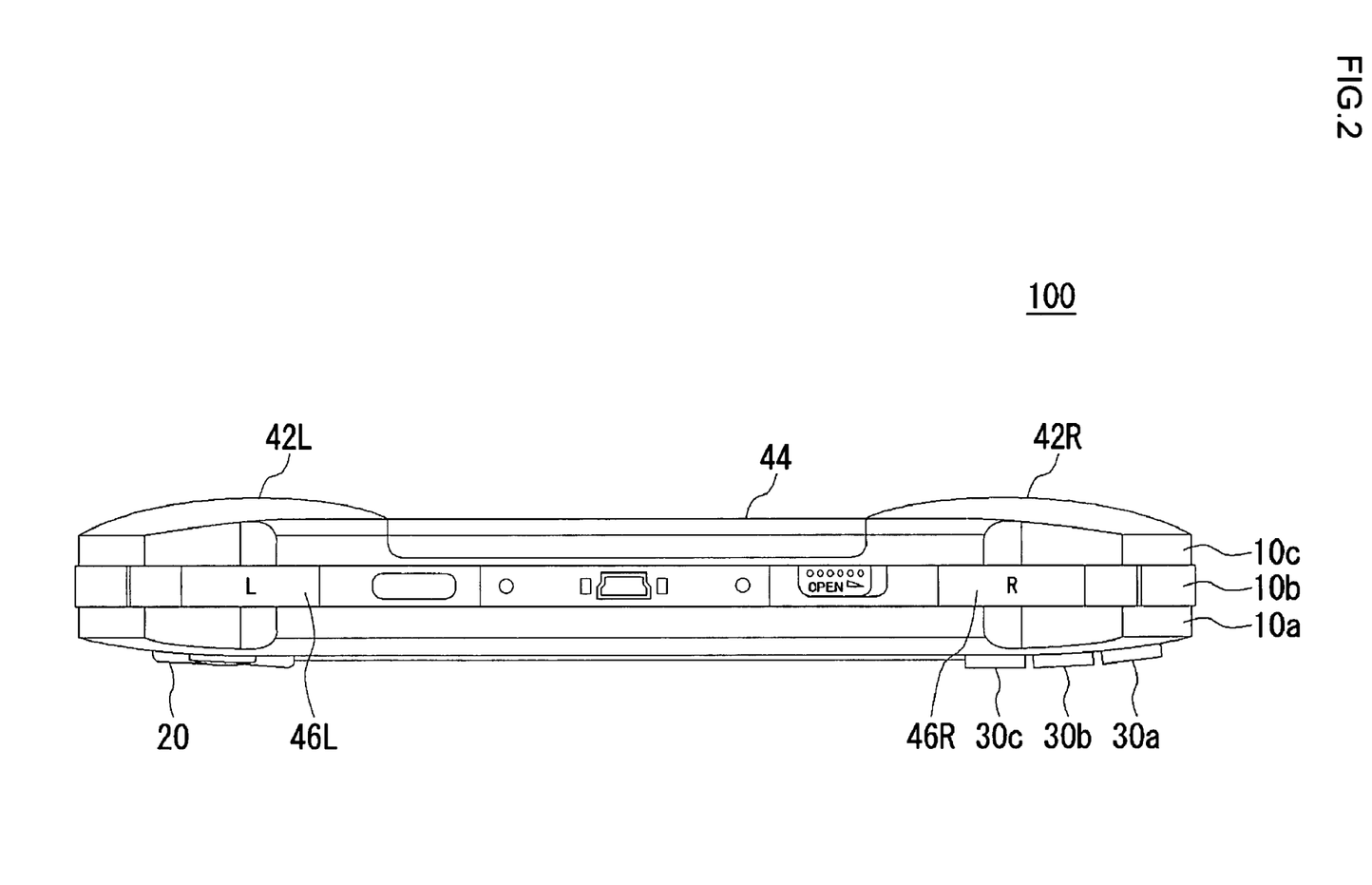
FIG. 2 is a top view of the electronic apparatus according to the embodiment.

FIG. 2 is a top view of the electronic apparatus 100 according to the embodiment. The housing 10 is comprised of the top part 10a, a middle part 10b and a bottom part 10c. Inside the housing 10 is built a circuit board (not shown) carrying components including switch nodes generating signals initiated by button operations and a central processing unit 200 for processing the signals and executing various operations accordingly. The circuit board (not shown) is fixed to the top part 10a and the bottom part 10c. The middle part 10b is more rigid than the top part 10a and the bottom part 10c, securing the rigidity of the housing 10 as a whole.

Bulges 42L and 42R are formed at both ends of the back of the housing 10. In between the bulges 42L and 42R is formed a flat surface, substantially the entirety of which constitutes a cover 44 for a small-sized disk drive. The cover 44 opens toward the top of FIG. 2 by sliding an OPEN switch provided in the middle part 10b. A disk is removably mounted in a small-sized disk drive (not shown) located below the cover 44. The disk provides an application program, a game program and the like run on the electronic apparatus 100. By exchanging disks, various game programs and the like can be run on the apparatus.

An open/close sensor 240 is provided inside the cover 44. The open/close sensor 240 detects an opening or closing action by a detector being moved by an urging member such as a spring when the cover 44 opens, thereby starting or stopping electric current conduction. In a shift to a disk drive non-use mode, the central processing unit 200 described later causes the open/close sensor 240 to detect the shift so as to acquire detection data. In a shift to a power saving mode, an exchange determination apparatus 230 described later causes the open/close sensor 240 to supply the detection data to the exchange determination apparatus 230. With this, a determination as to whether a disk 80 has been exchanged can be made. As long as the cover 44 is not open, it can be determined that the disk 80 has not been exchanged in all likelihood.

The electronic apparatus 100 according to the embodiment can function as a variety of types of apparatuses in accordance with a program stored in the disk 80. If the disk stores a game program, the electronic apparatus 100 functions as a game apparatus. If the disk stores music, the electronic apparatus 100 functions as an audio player. If the disk stores motion picture data, the electronic apparatus 100 functions as a motion picture player. The user can enjoy video contents such as movies. The electronic apparatus 100 is also provided with wireless communication function and is capable of downloading data from an external source and transmitting data to an external destination.

The electronic apparatus 100 is provided, at a location separate from the disk 80 as another recording medium apparatus, with an external memory insertion unit to which an external memory of a stick type or a card type is inserted. By inserting an external memory in this external memory insertion unit, information stored in the external memory can be read. For example, when the external memory stores music data, the electronic apparatus 100 is capable of causing a speaker 212 to provide audio output of the music data read from the external memory.

Figure 3:
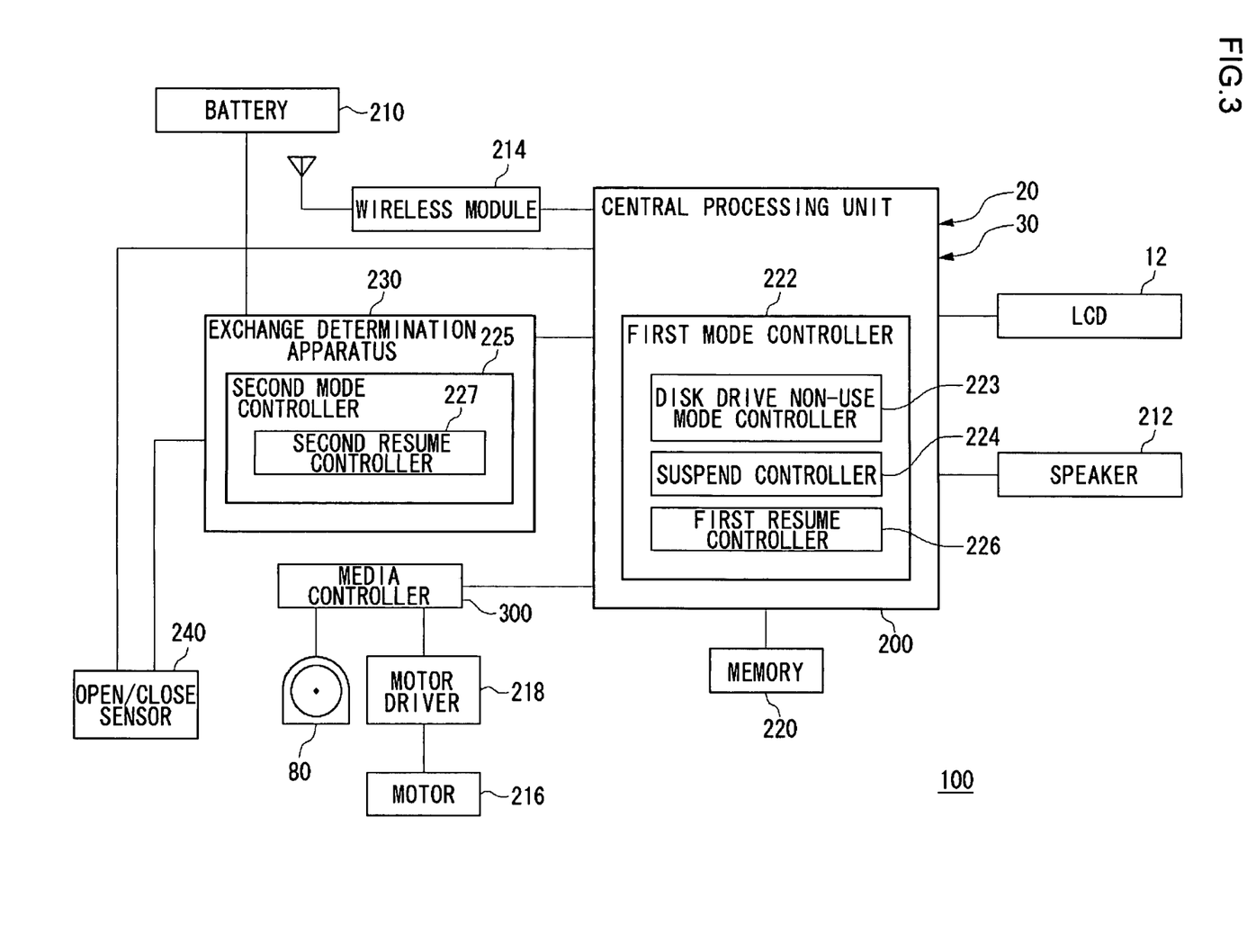
FIG. 3 shows the hardware structure of the electronic apparatus according to the embodiment.

FIG. 3 shows the hardware structure of the electronic apparatus 100 according to the embodiment. The electronic apparatus 100 comprises the central processing unit 200 for controlling the whole apparatus, a battery 210 for supplying electric power to the whole apparatus, an LCD 12 which is a display apparatus, the speaker 212 for providing audio output, a wireless module 214 for carrying out wireless communication, a motor 216 for rotating a disk drive in which the disk 80 is mounted, a motor drive 218 for driving the motor 216, a media controller 300 for controlling, for example, the reading of data and programs from the disk 80, and an exchange determination apparatus 230 for determining whether the disk 80 in the disk drive has been exchanged. Data and programs will be inclusively referred to as data.

The media controller 300 reads data stored in the disk 80 and temporarily stores the same in a memory in the media controller 300. The central processing unit 200 reads this data and carries out an associated process such as execution of a program and computation. The central processing unit 200 displays a result on the LCD 12 or outputs the result via the speaker 212. The central processing unit 200 receives a user input via the cursor key 20 or the push buttons 30 and similarly carries out an associated process such as execution of a program and computation, displaying a result on the LCD 12 or outputting the result via the speaker 212. Thus, when data related to a game is stored in the disk 80, for example, the user of the electronic apparatus 100 can enjoy the game by providing an input via the cursor key 20 and the push buttons 30 and receiving an output from the LCD 12 or the speaker 212.

The battery 210 supplies electric power to components including the LCD 12, the speaker 212, the wireless module 214, the exchange determination apparatus 230, the media controller 300, the motor driver 213, via the exchange determination apparatus 230 and the central processing unit 200.

The media controller 300 performs initial processes specific to the disk 80 when the disk 80 is mounted in the disk drive. For example, the media controller 300 reads information recorded in the disk 80 and specific to the recording medium such as identification information identifying the disk. The initial processes also include detection of characteristics specific to the recording medium and adjustment of an optical system and a drive system accordingly. The initial processes ensure proper access to the removable recording medium. Proper access means access in which few read errors occur. Thus, control adapted to the information and characteristics specific to the disk 80 mounted in the disk drive is enabled. The reliability in access from the media controller 300 to the disk 80, i.e. the reliability in data read, is improved.

When the initial processes are completed, the media controller 300 stores initial data derived from the initial processes in the memory in the media controller 300, the initial data including ID information of the disk 80, the result of adjustment of the optical system and drive system, and the like. The central processing unit 200 reads the initial data from the memory in the media controller 300 and stores the same in a memory 220. The memory 220 is formed of a DRAM. Power is continued to be supplied thereto from the battery 210 even in the power saving mode. Therefore, the data stored in the memory 220 is maintained.

The exchange determination apparatus 230 receives an input of detection data from the open/close sensor 240 provided interior to the cover 44 of the disk drive. For example, we assume a case in which conduction to the open/close sensor 240 is terminated when the cover 44 is closed, and conduction to the open/close sensor 240 is started when the cover 44 is open. While conduction to the open/close sensor 240 is terminated, an open/close flag is set too. When conduction to the open/close sensor 240 is started, the open/close flag is set to 1. In the power saving mode of the electronic apparatus 100, when conduction to the open/close sensor 240 is started and the open/close flag is set to 1 as a result of the cover 44 being opened, the exchange determination apparatus 230 maintains the open/close flag at 1 even when conduction is terminated as a result of the cover 44 being closed before the apparatus makes a shift to a normal mode. The open/close flag set by the exchange determination apparatus 230 is stored in a memory in the central processing unit 200 if the apparatus is in the disk drive non-use mode. In the power saving mode, the flag is stored in a memory in the exchange determination apparatus 230.

The exchange determination apparatus 230 is provided with a second mode controller 225 for controlling the mode of the electronic apparatus 100. The second mode controller 225 is provided with a second resume controller 227. The second resume controller 227 initiates a shift from the power saving mode to the normal mode when an input via a button such as a power button that turns power on or off is provided in the power saving mode, designating a shift to the normal mode. Return from the power saving mode to the normal mode also occurs when a predetermined input is provided via any of input units of the electronic apparatus 100. For example, the input may occur via the cursor key 20, the push buttons 30 or a power button that turns power on or off. Prior to return from the power saving mode to the normal mode, the second resume controller 227 reads the open/close flag stored in the memory in the exchange determination apparatus 230.

The central processing unit 200 is provided with a mode controller 222. The mode controller 222 comprises a disk drive non-use mode controller 223, a suspend controller 224 and a first resume controller 226.

As described above, the memory 220 stores initial data input from the media controller 300. As described above, power is continued to be supplied from the battery 210 even in the power saving mode so that the data stored in the memory 220 is maintained.

The mode controller 222 controls mutual shifts among the normal mode, the power saving mode and the disk drive non-use mode of the electronic apparatus 100. The power saving mode refers to a mode wherein the supply of power to the central processing unit 200, the LCD 12, the speaker 212 and the like is discontinued for reduction in power consumption. The disk drive non-use mode is a mode wherein the supply of power to a disk drive provided with the media controller 300, the motor driver 218 and the like is discontinued upon determination that the disk drive that reads information from the disk 80 inserted into the drive is not used. Such determination may be made when the reading of information stored in an external memory is selected by operating the cursor key 20 or the pushbuttons 30 in accordance with guidance for medium selection displayed on the LCD 12 in a state in which the external memory is inserted in the external memory insertion unit. The determination that the disk drive that reads information from the disk 80 inserted in the drive is not used may be made upon insertion of the external memory into the external memory insertion unit. Upon this determination, the supply of power to the disk drive that comprises the media controller 300, the motor driver 218 and the like may be discontinued. The normal mode is a mode other than the power saving mode and the disk drive non-use mode, wherein power is supplied to the disk drive that comprises the media controller 300, the motor driver 218 and the like, the central processing unit 200, the LCD 12, the speaker 212 and the like.

The disk drive non-use mode controller 223 of the mode controller 222 may initiate a shift from the normal mode to the disk drive non-use mode when the reading of information stored in an external memory is selected by the user's operation in a state in which the external memory is inserted in the external memory insertion unit. Upon shifting to the disk drive non-use mode, the central processing unit 200 requests the exchange determination apparatus 230 to discontinue the supply of power to the disk drive that comprises the media controller 300, the motor driver 218 and the like, whereupon the exchange determination apparatus 230 discontinues the supply of power to the disk drive. Power is continued to be supplied, however, to the central processing unit 200, the LCD 12, the speaker 212 and the like in order to allow, for example, playback of music data stored in the external memory. With this, the supply of power to the disk drive is discontinued when the disk drive is not used, achieving power saving in the electronic apparatus 100. When the electronic apparatus 100 is driven by a battery as in the case of the game apparatus according to the embodiment, battery drive time of the electronic apparatus 100 is extended.

The suspend controller 224 of the mode controller 222 initiates a shift from the normal mode to the power saving mode when an input is provided via a button, such as a power button that turns power on or off, for initiating the power saving mode. When the condition relative to the operation of the electronic apparatus 100 is detected by, for example, measuring the duration of absence of operation in which the cursor key 20 or the push buttons 30 are not operated, and a determination is made accordingly that the user operation in the electronic apparatus does not take place for a predetermined period of time, the suspend controller may initiate a shift from the normal mode to the power saving mode. Upon shifting to the power saving mode, the central processing unit 200 requests the exchange determination apparatus 230 to discontinue the supply of power to the LCD 12, the speaker 212, the wireless module 214, the media controller 300, the motor driver 218 and the like, whereupon the exchange determination apparatus 230 discontinues the supply of power to these components. The central processing unit 200 also issues a suspend request, whereupon the exchange determination apparatus 230 discontinues the supply of power to the central processing unit 200. However, the memory 220 continues to be supplied with power in order to maintain what is stored in the memory 220. The supply of power to the exchange determination apparatus 230 is also maintained since it has to detect whether the cover 44 is opened or closed in the power saving mode and the second resume controller 227 has to monitor the electronic apparatus 100 for return from the power saving mode to the normal mode. With this, power saving in the electronic apparatus 100 is achieved. When the electronic apparatus 100 is driven by a battery as in the case of the game apparatus according to the embodiment, battery drive time of the electronic apparatus 100 is extended.

The first resume controller 226 initiates a shift from the disk drive non-use mode to the normal mode when the external memory is detached from the external memory insertion unit in the disk drive non-use mode. In this process, the first resume controller 226 reads the open/close flag stored in the memory in the central processing unit 200 prior to the return from the disk drive non-use mode to the normal mode.

If the open/close flag stored in the memory in the central processing unit 200 or in the memory in the exchange determination apparatus 230 is set to 0, the first resume controller 226 determines that the cover 44 has not been opened, or there is no possibility that the disk 80 has not been exchanged, whereupon the first resume controller 226 initiates the return to the normal mode. In a return from the disk drive non-use mode, the central processing unit 200 resumes the supply of power to the disk drive that comprises the media controller 300, the motor driver 218 and the like, by issuing an associated request to the exchange determination apparatus 230. In a return from the power saving mode, the exchange determination apparatus 230 resumes the supply of power to the central processing unit 200, the LCD 12, the speaker 212, the wireless module 214, the media controller 300, the motor driver 218 and the like. Since there is no likelihood that the disk 80 has been exchanged, the initial data stored in the memory 220 can be used for proper access to the disk 80. Therefore, the central processing unit 200 supplies the initial data stored in the memory 220 to the media controller 300. Upon receipt of the initial data, the media controller 300 skips the aforementioned initial processes and uses the initial data for access to the disk 80. As described, when the disk 80 remains unchanged, the aforementioned initial processes can be skipped while ensuring proper access to the disk 80. With this, time required to read information stored in the disk 80 is reduced.

If the open/close flag stored in the memory in the central processing unit 200 or in the memory in the exchange determination apparatus 230 is set to 1, it means that the cover 44 has been opened. In this case, the first resume controller 226 determines that the disk 80 may have been exchanged, whereupon the central processing unit 200 causes the media controller 300 to perform the initial processes. When the initial processes have been completed, the first resume controller 226 initiates a return from the disk drive non-use mode or the power saving mode to the normal mode. Thus, it is ensured that the initial processes are performed when there is a possibility that the disk 80 is exchanged so that the reliability in reading information from the disk 80 by the media controller 300 is improved.

Figure 4:
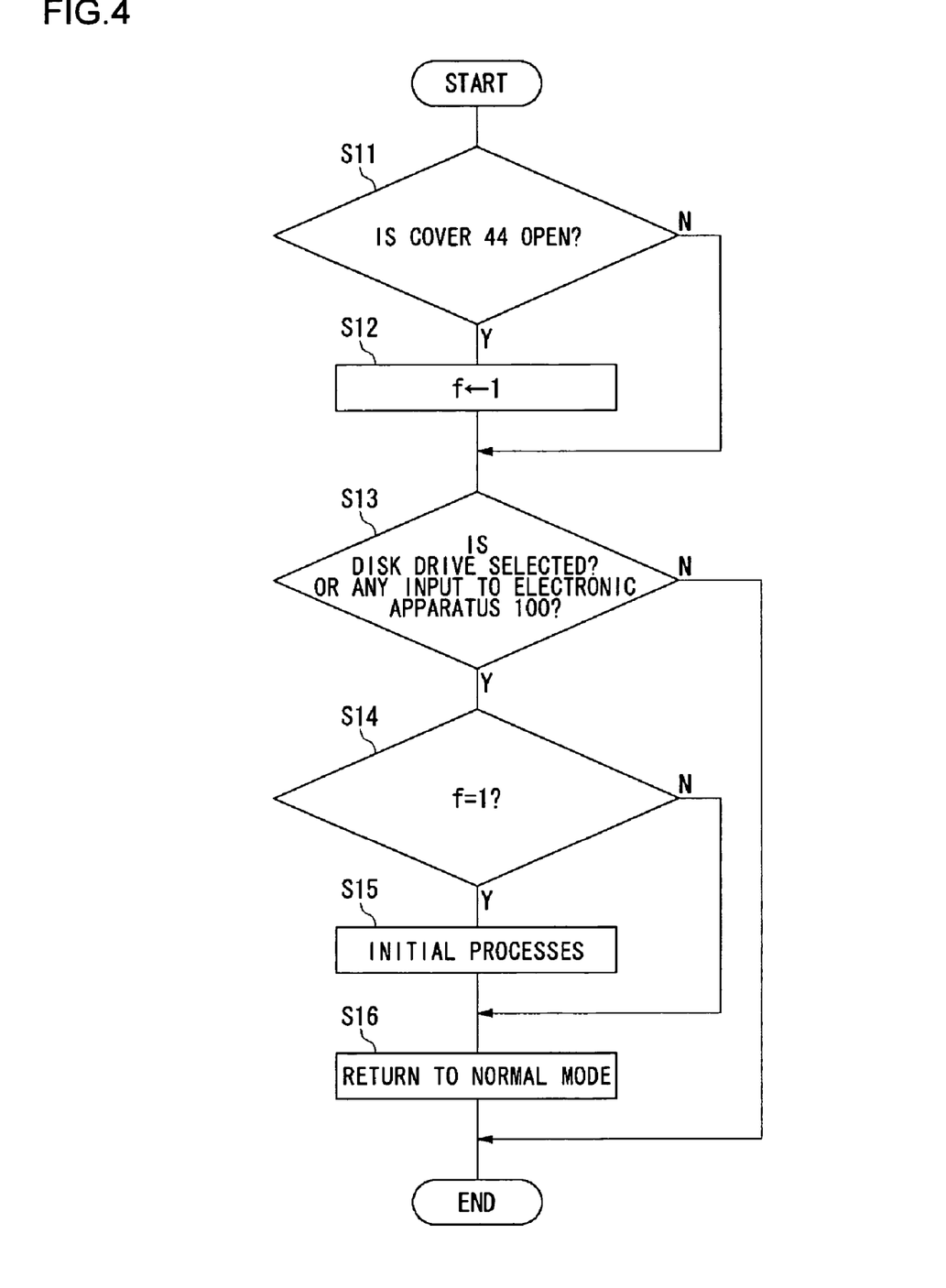
FIG. 4 is a flowchart showing the operation of the electronic apparatus according to the embodiment.

FIG. 4 is a flowchart showing the operation of the electronic apparatus 100 according to the embodiment. The process of the flowchart is started while the electronic apparatus 100 is in the disk drive non-use mode or the power saving mode. Alternatively, the flow may be started at predetermined time intervals. Once the central processing unit 200 or the exchange determination apparatus 230 makes a shift from the normal mode to the disk drive non-use mode or the power saving mode, the open/close flag f indicating whether the cover 44 is open is set to 0, whereupon the flow is started.

Even in the power saving mode, the exchange determination apparatus 230 continues to be supplied with power and receives an input of detection result from the open/close sensor 240. The exchange determination apparatus 230 determines whether the cover 44 is open by referring to the detection result from the open/close sensor 240 (S11).

When it is determined from the detection result from the open/close sensor 240 that the cover 44 is open (Y in S11), the central processing unit 200 or the exchange processing apparatus 230 sets the open/close flag f to 1 (S12). In the disk drive non-use mode, the flag is stored in the memory in the central processing unit 200. In the power saving mode, the flag is stored in the memory in the exchange determination apparatus 230. When it is determined from the result of detection in the open/close sensor 240 that the cover 44 is not open (N in S11), the open/flag maintains the current setting. If the open/close flag f is set to 1 as a result of the cover 44 being opened after a shift to the power saving mode and the central processing unit 200 or the exchange determination apparatus 230 subsequently determines that the cover 44 is not open as a result of the cover 44 being closed, the open/close flag f is not set to 0 and maintained at 1. Thus, it is possible to maintain the determination that the cover 44 may have been opened, i.e., the disk may have been exchanged even if the cover 44 is opened and then closed while the electronic apparatus 100 is in the disk drive non-use mode or the power saving mode.

If the electronic apparatus 100 is in the disk drive non-use mode, the first resume controller 226 of the central processing unit 200 determines whether the user selects the disk drive. If the electronic apparatus 100 is in the power saving mode, the second resume controller 227 of the exchange determination apparatus 230 determines whether any input is provided in the electronic apparatus 100 with the cursor key 20, the push buttons 30 or the power button that turns power on or off (S13). When the disk drive is not selected or when no input is provided in the electronic apparatus 100 (N in S13), the first resume controller 226 or the second resume controller 227 respectively maintains the disk drive non-use mode or the power saving mode and terminates the process of the flowchart.

When the disk drive is selected or an input is provided in the electronic apparatus 100 (Y in S13), the first resume controller 226 or the second resume controller 227 acquires the open/close flag f stored in the memory in the central processing unit 200 or the memory in the exchange determination apparatus 230 so as to determine whether the open/close flag f is set to 1 (S14).

If the open/close flag f is set to 1 (Y in S14), the central processing unit 200 determines that the disk 80 may have been exchanged as a result of the cover 44 of the disk drive being opened and does not transfer the initial data to the media controller 300. Since the initial data is not transferred, the media controller 300 determines that the disk 80 may have been exchanged and performs the initial processes (S15).

If the open/close flag f is set to 0 (N in S14), the central processing unit 200 determines that the cover 44 of the disk drive has not been opened, i.e., the disk 80 has not been exchanged. The central processing unit 200 then transfers the initial data stored in the memory 220 to the media controller 300 to cause the data to be stored in the memory in the media controller 300. Since the initial data is transferred, the media controller 300 determines that there is no possibility that the disk 80 has been exchanged, whereupon the media controller 300 skips the initial processes. In this case, the media controller 300 accesses the disk 80 using the initial data transferred from the central processing unit 200.

Thus, when there is no possibility that the disk 80 has been exchanged, the initial processes can be skipped, while ensuring proper access to the disk 80 by using the initial data stored in the memory 220. Time required for a shift from the power saving mode to the normal mode is reduced accordingly. When there is a possibility that the disk 80 has been exchanged, the initial processes can be performed so that the reliability of access from the media controller 300 to the disk 80 is improved.

When the initial processes are performed (S15) or when the initial processes are skipped (N in S14), the first resume controller 226 returns the electronic apparatus 100 from the disk drive non-use mode or the power saving mode to the normal mode (S16). If a return from the disk drive non-use mode is initiated, the central processing unit 200 resumes the supply of power to the disk drive that comprises the media controller 300, the motor driver 218 and the like, by issuing an associated request to the exchange determination apparatus 230. If a return from the power saving mode is initiated, the central processing unit 200 resumes the supply of power to the LCD 12, the speaker 212, the wireless module 214, the media controller 300, the motor driver 218 and the like, and terminates the process of the flowchart.

Figure 5:
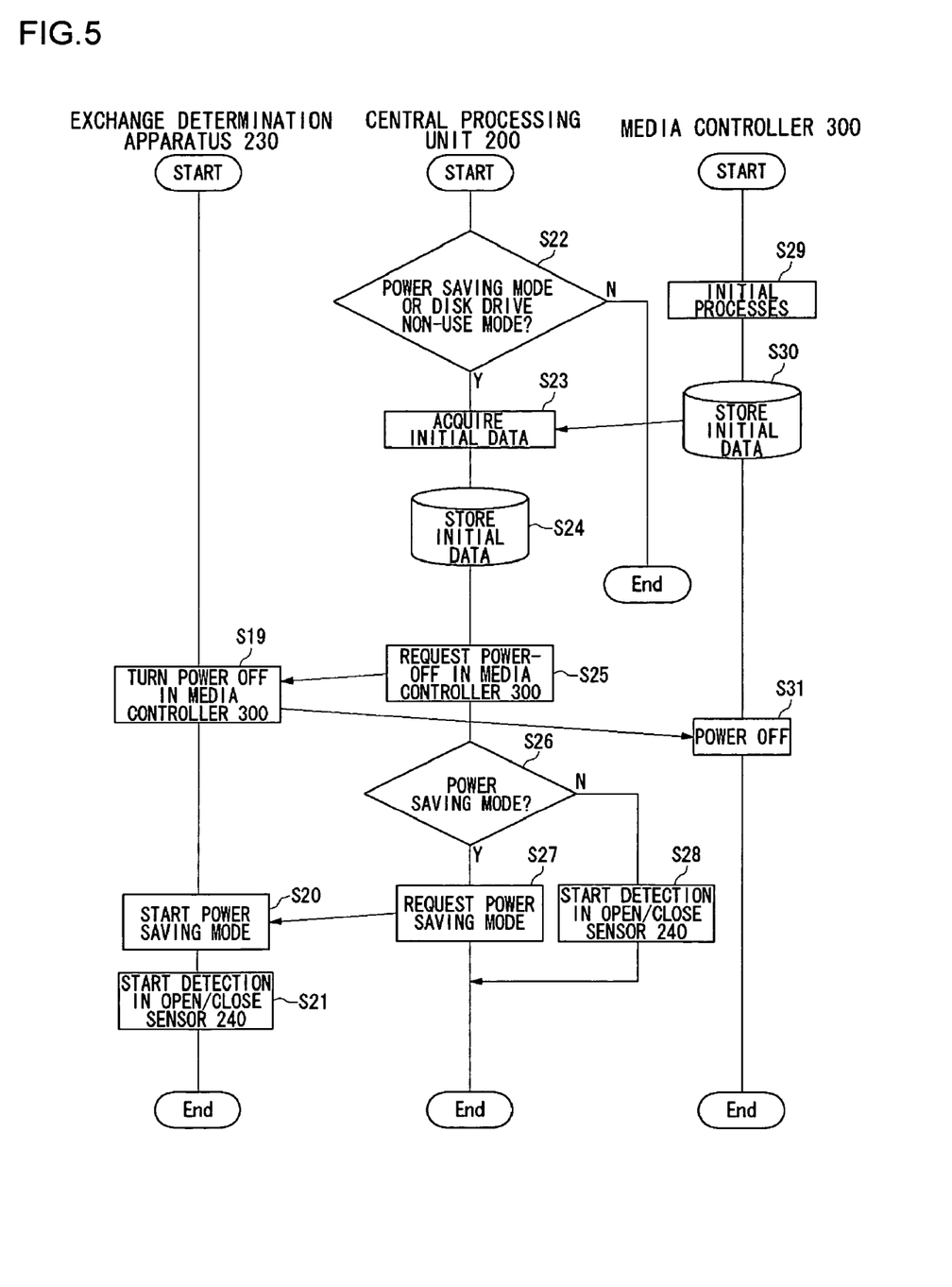
FIG. 5 is a flowchart showing the operation according to the embodiment of the components of the electronic apparatus performed in a shift from a normal mode to a power saving mode or a disk drive non-use mode.

FIG. 5 is a flowchart showing the operation according to the embodiment of the components of the electronic apparatus 100 performed in a shift from the normal mode to the power saving mode or the disk drive non-use mode. The central processing unit 200 determines whether power to the media controller 300 is turned off due to a shift to the power saving mode or the disk drive non-use mode (S22).

If it is determined that the power-off is due to a shift to the power saving mode or the disk drive non-use mode (Y in S22), the central processing unit 200 reads the initial data stored in the media controller 300 (S23). The initial data stored in the media controller 300 is derived from the initial processes performed by the media controller 300 for proper reading from the disk 80 (S29) and is stored in the memory in the media controller 300 (S30). After reading the initial data from the memory in the media controller 300, the central processing unit 200 stores the initial data in the memory 220 (S24). When the power-off is not due to a shift to the power saving mode or the disk drive non-use mode, and terminates the process of the flowchart (N in S22).

The central processing unit 200 requests the exchange determination apparatus 230 to turn power off (S25), whereupon the exchange determination apparatus 230 turns off power supplied to the media controller 300. Thus, the supply of power to the media controller 300 is discontinued (S31).

Subsequently, the central processing unit 200 determines whether a shift to power saving mode is initiated (S26). If a shift to the power saving mode is initiated (Y in S26), the suspend controller 224 of the central processing unit 200 requests the exchange determination apparatus 230 to start the power saving mode (S27). The exchange determination apparatus 230 then suspends the supply of power to the central processing unit 200 so as to start the power saving mode (S20). The exchange determination apparatus 230 causes the open/close sensor 240 to start detecting whether the cover 44 is open or closed (S21). If a shift to the power saving mode is not initiated (N in S26), the central processing unit 200 causes the open/close sensor 240 to start detection (S28).

Figure 6:
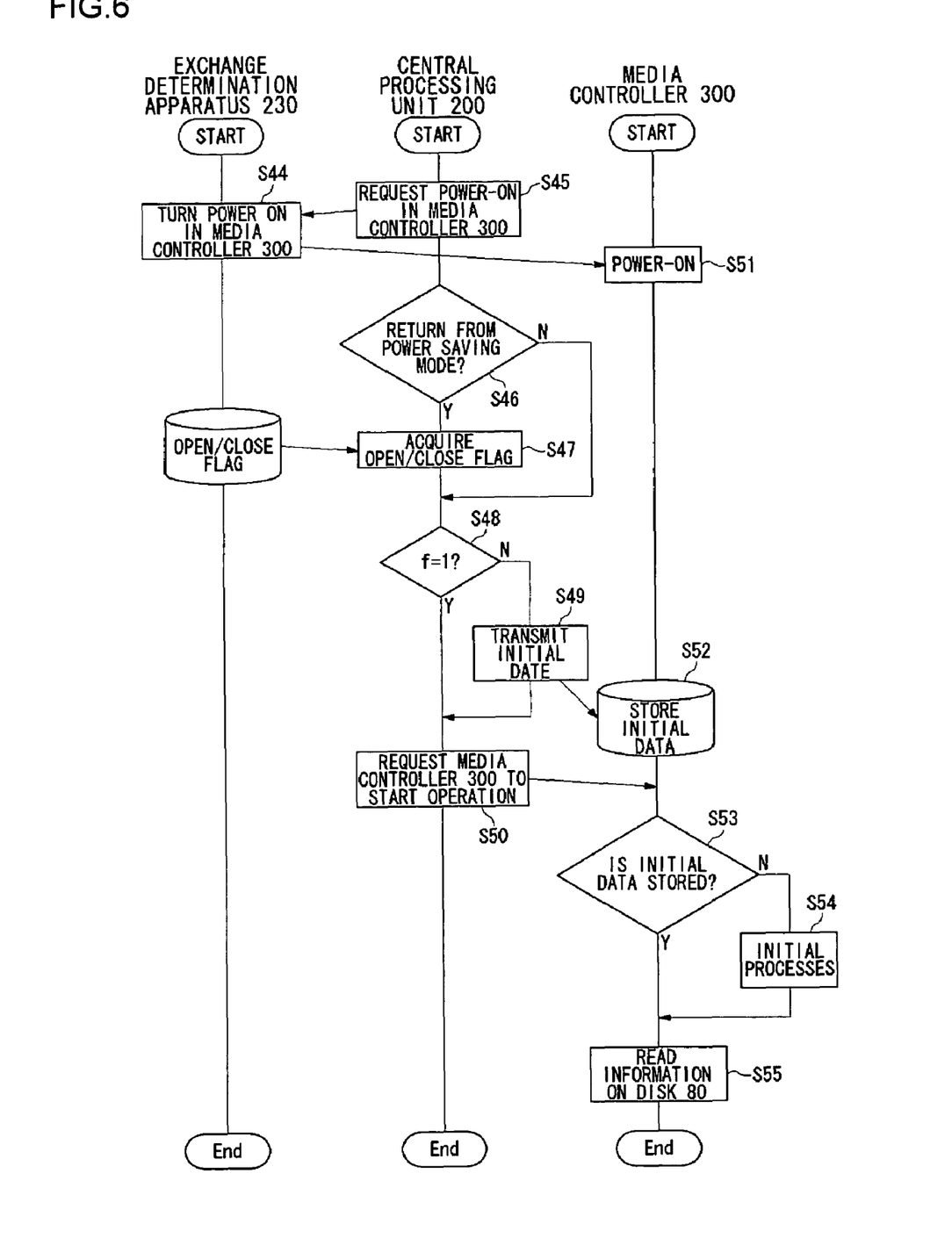
FIG. 6 is a flowchart showing the operation according to the embodiment of the components of the electronic apparatus performed in a return from the power saving mode or the disk drive non-use mode to the normal mode.

FIG. 6 is a flowchart showing the operation according to the embodiment of the components of the electronic apparatus 100 performed in a return from the power saving mode or the disk drive non-use mode to the normal mode. The central processing unit 200 requests the exchange determination apparatus 230 to turn on power supplied to the media controller 300 (S45). The exchange determination apparatus 230 turn on power supplied to the media controller 300 (S44) so power is supplied to the media controller 300 (S51).

Subsequently, the central processing unit 200 determines whether a return from the power saving mode to the normal mode is initiated (S46). In the power saving mode, the exchange determination apparatus 230 causes the open/close sensor 240 to supply the detection data. The open/close flag is stored in the memory in the exchange determination apparatus 230. Therefore, if a return from the power saving mode to the normal mode is initiated (Y in S46), the central processing unit 200 acquires the open/close flag from the memory in the exchange determination apparatus 230. In the disk drive non-use mode, the central processing unit 200 causes the open/close sensor 240 to supply the detection data. The open/close flag is stored in the memory in the central processing unit 200. Therefore, if the return is not from the power saving mode to the normal mode, i.e., if the return is from the disk drive non-use mode to the normal mode, the central processing unit 200 does not acquire the open/close flag (N in S46).

Subsequently, the central processing unit 200 determines whether the open/close flag is set to 1 (S48). If the open/close flag is set to 1 (Y in S48), it means that the cover 44 has been opened. In this case, the central processing unit 200 determines that the disk 80 may have been exchanged. The central processing unit 200 requests the media controller 300 to start its operation without transferring the initial data stored in the memory 220 to the media controller 300, in order to cause the media controller 300 to perform the initial processes again so as to acquire the initial data (S50). If the open/close flag is not set to 1 (N in S48), it means that the cover 44 is not open. In this case, the central processing unit 20 determines that there is no possibility that the disk 80 has been exchanged. The central processing unit 200 stores, in the memory in the media controller 300, the initial data stored in the memory 220 in order to cause the media controller 300 to read information in the disk 80 using the initial data stored in the memory 220 (S52).

When the determination as to whether the open/close flag f is set to 1 is completed, the central processing unit 200 requests the media controller 300 to starts its operation (S50). Upon receipt of the request from the central processing unit 200 to starts its operation, the media controller 300 determines whether the initial data is stored in the memory in the media controller 300 (S52). When the initial data is stored in the memory in the media controller 300 (Y in S52), the media controller 300 reads information on the disk 80 using the initial data (S55). Thus, time required to read information stored in the disk 80 is reduced.

When the initial data is not stored in the memory in the media controller 300 (N in S52), the media controller 300 determines that the disk 80 may have been exchanged and performs the initial processes (S54). When there is a possibility that the disk 80 has been exchanged, the initial processes can be performed, and the reliability of access from the media controller 300 to the disk 80 is improved.

When an error occurs in reading information from the disk 80 (S55), the media controller 300 performs the initial processes and reads information on the disk again, regardless of whether information is read from the disk 80 by using the initial data transferred from the central processing unit 200 (Y in S53) or information is read from the disk 80 after performing the initial processes (N in S53).

The present invention is not limited to the embodiment. Variations within the scope of the present invention such as design modifications can be made to the embodiment on the basis of the knowledge of the skilled person. Some examples of such variations will be described below.

The memory 220 may be implemented by a nonvolatile memory such as a flash memory so as to ensure that data remains stored in the memory 220 even when the supply of power is discontinued. With this, the supply of power to the memory 200 may be discontinued in, for example, the power saving mode.

Determination as to whether the disk 80 has been exchanged may be made by detecting whether the disk 80 is detached. With this, determination as to whether the disk 80 has been exchanged can be made more properly. A determination that the disk 80 has not been exchanged is made when the disk 80 has not been detached. If the disk 80 is of a type housed in a cassette, detection of whether the disk 80 has been detached may be made by an arrangement in which a retractable detector is compressed as it is thrust by an inserted cassette and starts conducting, and in which the detector stops conducting as it is released and projects itself when the cassette is removed. If the disk 80 is disk-shaped, detection may be made of whether a fixing part is introduced into the central hole of the disk. The result of detection of whether the disk 80 is detached is input to the exchange determination apparatus 230.

In the disk drive non-use mode, detection of a signal from the open/close sensor may be made by the exchange determination apparatus 230 instead of the central processing unit 200. In this case, the open/close flag is temporarily stored in the memory in the exchange determination apparatus. The central processing unit 200 acquires the open/close flag stored in the memory in the exchange determination apparatus 230 and stores the same in the memory in the central processing unit 200.

While the preferred embodiments of the present invention have been described using specific terms, such description is for illustrative purposes only, and it is to be understood that changes and variations may be made without departing from the spirit or scope of the appended claims.

What is claimed is:

1. An electronic apparatus comprising:
   a media reader operative to read data recorded in a removable recording medium;
   a media controller operative to control the reading of data from the recording medium by the media reader, and acquire initial data by using a recording medium for ensuring proper reading of data from the recording medium;
   a memory operative to store the initial data thus read;
   a central processing unit operative to carry out a process including execution of a program and computation and to control the whole apparatus; and
   an exchange determination unit operative to monitor whether the recording medium is exchanged, wherein
   the exchange determination unit starts monitoring whether the recording medium is exchanged upon a shift to a power saving mode, in which the power supply to both the central processing unit and the media controller is discontinued, from a normal mode, in which power is supplied to both the media controller and the central processing unit,
   the central processing unit starts monitoring whether the recording medium is exchanged upon a shift to a disk drive non-use mode, in which the power supply to the central processing unit is maintained and the power supply to the media controller is discontinued, from the normal mode,
   the memory is configured to retain the stored initial data in any of the normal mode, power saving mode, and the disk drive non-use mode, and
   the media controller reads, upon a return from the power saving mode to the normal mode, data from the recording medium by using the initial data stored in the memory if the result of monitoring by the exchange determination unit indicates that the recording medium is not exchanged, and reads, upon a return from the disk drive non-use mode to the normal mode, data from the recording medium by using the initial data stored in the memory if the result of monitoring by the central processing unit indicates that the recording medium is not exchanged.

2. The electronic apparatus according to claim 1, further comprising:
   an opening and closing unit operative to enable the recording medium to be exchanged by being opened; and
   an open/close sensor operative to detect an opening or closing of the opening and closing unit, wherein
   the central processing unit monitors whether the recording medium is exchanged by retaining data indicating whether the opening of the opening and closing unit is detected,
   the exchange determination unit monitors whether the recording medium is exchanged by retaining data indicating whether the opening of the opening and closing unit is detected, and
   the media controller reads, upon a return from the power saving mode to the normal mode, data from the recording medium by using the initial data stored in the memory if the data retained in the exchange determination unit indicates that the opening of the opening and closing unit is not detected, and reads, upon a return from the disk drive non-use mode to the normal mode, data from the recording medium by using the initial data stored in the memory if the data retained in the central processing unit indicates that the opening of the opening and closing unit is not detected.

3. The electronic apparatus according to claim 1, further comprising:
   a detachment detector operative to detect whether the recording medium is detached, wherein
   the exchange determination unit determines that there is no likelihood that the recording medium is exchanged if the detachment detector does not detect that the recording medium is detached after the power saving mode is entered and before the normal mode is resumed.

4. The electronic apparatus according to claim 1, further comprising:
   a detachment detector operative to detect whether the recording medium is detached, wherein
   the central processing unit monitors whether the recording medium is exchanged by retaining data indicating whether the detachment of the recording medium is detected, the exchange determination unit monitors whether the recording medium is exchanged by retaining data indicating whether the detachment of the recording medium is detected, and the media controller reads, upon a return from the power saving mode to the normal mode, data from the recording medium by using the initial data stored in the memory if the data retained in the exchange determination unit indicates that the detachment of the recording medium is not detected, and reads, upon a return from the disk drive non-use mode to the normal mode, data from the recording medium by using the initial data stored in the memory if the data retained in the central processing unit indicates that the detachment of the recording medium is not detected.

5. A media control method for an electronic apparatus comprising a media reader operative to read data recorded in a removable recording medium, comprising:

acquiring initial data by using a recording medium for ensuring proper reading of data from the recording medium;

storing the initial data thus read in a memory;

causing an exchange determination unit to start monitoring whether the recording medium is exchanged upon a shift to a power saving mode, in which the power supply is discontinued to both a central processing unit operative to control the whole apparatus and a media controller operative to control the reading of data from the recording medium by the media reader, from a normal mode, in which power is supplied to both the media controller and the central processing unit, and causing the central processing unit to start monitoring whether the recording medium is exchanged upon a shift to a disk drive non-use mode, in which the power supply to the central processing unit is maintained and the power supply to the media controller is discontinued, from the normal mode; and reading, upon a return from the power saving mode to the normal mode, data from the recording medium by using the initial data stored in the memory if the result of monitoring by the exchange determination unit indicates that the recording medium is not exchanged, and reading, upon a return from the disk drive non-use mode to the normal mode, data from the recording medium by using the initial data stored in the memory if the result of monitoring by the central processing unit indicates that the recording medium is not exchanged.

\* \* \* \* \*